R. P. Buttles,
Bee Hive.
No. 86,729. Patented Feb. 9. 1869.
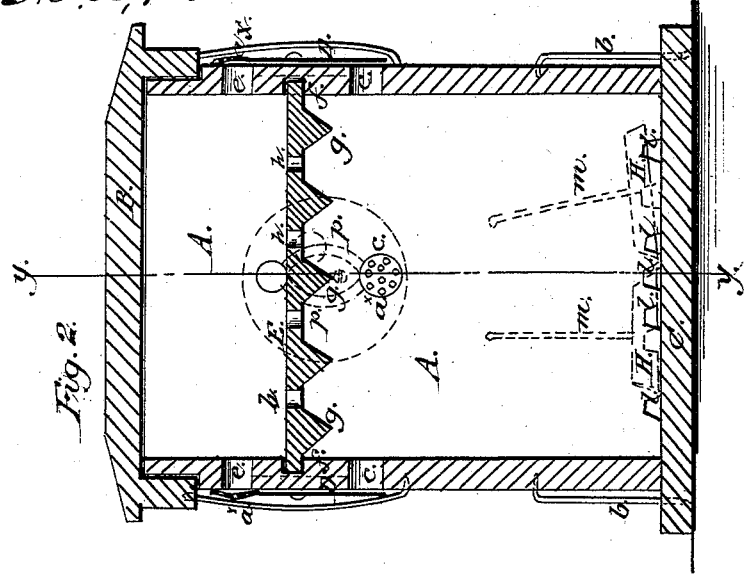
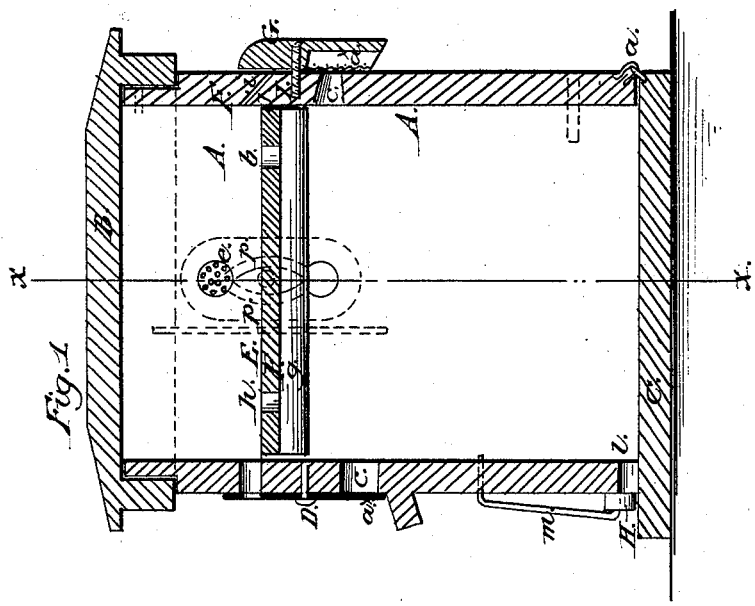
Witnesses:
Wm. A. Morgan
G. C. Cotton
Inventor:
R. P. Buttles

R. P. BUTTLES, OF MANSFIELD, PENNSYLVANIA.

Letters Patent No. 86,729, dated February 9, 1869.

IMPROVEMENT IN BEE-HIVES.

The Schedule referred to in these Letters Patent and making part of the same.

*To all whom it may concern:*

Be it known that I, R. P. BUTTLES, of Mansfield, in the county of Tioga, and State of Pennsylvania, have invented a new and useful Improvement in Bee-Hives; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $y\ y$, fig. 2.

Figure 2 is a vertical section of the same, taken in the line $x\ x$, fig. 1.

Similar letters of reference indicate like parts.

This invention relates to a new and useful improvement in the construction of bee-hives, whereby proper ventilation is obtained, with simplicity in construction.

In the accompanying sheet of drawings—

A represents the body of the hive, which is of quadrilateral form, and is provided with a cap, B, and a bottom board, C, the latter being attached, at its rear edge, to the lower edge of the rear side of the hive, by hinges $a\ a$, and secured in a closed state, by suitable catches $b\ b$, shown in fig. 2.

In the upper part of the body A of the hive there are openings $c$, and above these are similar openings $e$.

Buttons, D, of sheet-metal, are attached to the side of the hive, and at such points as to cover the openings $c\ e$, when adjusted or turned in a certain position, and these buttons are perforated at one end or at one part, as shown at $a^\times$, to admit air through the openings, when desired.

When ventilation requires to be checked, the imperforate portions of the buttons are adjusted over the openings, as shown in dotted lines in fig. 2.

The ventilating-openings $c\ e$ are connected by the grooves $p\ p$, made in the outer surface of the two opposite sides of the hive. These grooves should be made from one-quarter to one-half inch in depth, so as to allow the air to circulate somewhat freely through them when the imperforate parts of the buttons D are turned over the openings $c\ e$. By this means a much more equable temperature is preserved within the two chambers of the hive, than would otherwise be the case.

E is the honey-board, which is fitted horizontally in the hive in grooves $f\ f$, and has its under side grooved to form V-shaped pendent projections $g$, which projections serve as guides for the bees in commencing the building of their combs. This is fully shown in fig. 2.

This honey-board is adapted to be slid out of or removed from the hive by means of the grooves $f$, on removing the board to which the button G is attached, and which is held in place by four screws.

This honey-board is perforated, as shown at $h$, to admit of the bees passing through it.

At the rear side of the hive, and opposite the rear edge of the honey-board, there is inserted a slip, F, which has its lower edge bevelled, as shown at $i$, and this bevelled lower edge rests on a corresponding bevel, $j$, in the back of the hive, so that the slip is inserted in the back of the hive, and withdrawn threrefrom in an oblique direction, and consequently may be retained in place by a button, G, as will be understood by referring to fig. 1.

The button G is formed with a recess, $a^\times$, in its under side, which is covered with wire gauze, whereby means of constant ventilation is provided, while moths, or other insects, are effectually excluded.

By turning this button at any time, around from a vertical position, the slip F may be removed, and the interior of the hive inspected.

In the lower edge of the front of the hive, there are made notches $l$, over which slides H work. Said slides are notched in their lower edges, to correspond to the notches $e$ in the lower edge of the front of the hive.

These slides are each suspended at the front side of the hive by a single wire, or rod, $m$, so that each may be adjusted at any desired angle independently of the other. This means of suspension also allows the slides to be reversed or turned with the straight edge down. It also possesses the additional advantage of allowing but one or both entrances to be closed, or opened, without, as in hives of different construction, exposing the whole entrance.

By my construction of slides with notches, said slides may be so set as to allow but one bee to escape at a time, or as many as may be desired in succession.

The slides may be adjusted with the greatest facility to fully or partially cover the notches $l$, so as to exclude the drones, and admit only the "workers" to pass in and out of the hive, in which case the passage should be three-eighths of an inch in diameter. This will be fully understood by referring to fig. 2.

This hive may be constructed at a small cost, and possesses all the advantages of the more pretentious and expensive ones now in use.

Having thus described my invention,

I claim as new, and desire to secure by Letters Patent—

1. The ventilating-openings $c\ e$ and grooves $p\ p$, in combination with the buttons D, perforated at one end, or part, substantially as and for the purpose specified.

2. The slides H, when suspended by a single rod, $m$, and provided with notches registering with the notches $l$, in the front side of the hive, as and for the purpose herein set forth.

3. The wooden ventilating-button G, having the recess $a^\times$ in its under side, covered with wire gauze, substantially as herein described, for the purpose specified.

4. The combination of the ventilating-button G, opening C, and slip F, as and for the purpose herein described.

R. P. BUTTLES.

Witnesses:
A. J. WEBSTER,
F. W. CLARK.